United States Patent [19]

Seager

[11] Patent Number: 4,524,103

[45] Date of Patent: Jun. 18, 1985

[54] FILTER PAPER

[75] Inventor: Nigel J. Seager, Kent, England

[73] Assignee: Whatman Reeve Angel Public Limited Company, Maidstone, England

[21] Appl. No.: 542,299

[22] Filed: Oct. 14, 1983

[30] Foreign Application Priority Data

Oct. 15, 1982 [GB] United Kingdom ............... 8229533

[51] Int. Cl.³ ............................................. B32B 7/00
[52] U.S. Cl. ................................. 428/338; 428/339
[58] Field of Search ............................. 428/338, 339

[56] References Cited

U.S. PATENT DOCUMENTS

| 3,992,223 | 11/1976 | Gutbier | 429/14 |
| 4,008,339 | 2/1977 | Matsuda et al. | 528/335 |
| 4,053,052 | 10/1977 | Jasper | 206/439 |
| 4,132,528 | 1/1979 | Eikenberry et al. | 436/86 |
| 4,147,114 | 4/1979 | Holmes | 210/298 |

*Primary Examiner*—Bernard Lipman
*Attorney, Agent, or Firm*—Richard P. Crowley

[57] ABSTRACT

Filter paper having highly advantageous properties is made, by conventional paper-making techniques, from a slurry of polyaramid fibrous material. This has been prepared by the treatment of polyaramid filaments to reduce their diameter by splitting them into fibrilated material.

8 Claims, No Drawings

FILTER PAPER

BACKGROUND OF THE INVENTION

This invention relates to filter papers and methods of making them.

Aromatic polyamide fibres include the specific subclass of aramids (also known as polyaramids) such as Kevlar (Dupont Reg. Trade Mark) are produced in filaments which have very high tensile strength and chemical stability. The filaments, although solid, are, in effect, bundles of fibres which are held together by weak chemical and electrostatic forces and can hence be separated or split into finer fibrous bundles.

SUMMARY OF THE INVENTION

We use this property of these fibres to prepare a filter paper which has highly advantageous properties, notably chemical stability and a high degree of retention derived from splitting of the fibrous bundles into finer fibres.

We find that the fibres can be reduced in length and then progressively reduced in diameter down to sizes lower than those of glass microfibre microfibrils. From these extremely fine fibres were form a filter material. This material shows filtration properties which are similar to filter papers made from the finest glass microfibres, but with improved chemical stability. We believe that by further application of our method we can also achieve improved filtration properties.

Because aromatic polyamide fibres are stiff like glass microfibres they are suitable for making very fine filter papers. However, unlike glass microfibers they do not fracture when subjected to wet pressing in the paper making process. This property also enhances filters made from such fibres.

DESCRIPTION OF SPECIFIC EMBODIMENT

Example

Kevlar fibres are usually supplied at a diameter of about 12 microns. In this example we produced a filter paper from Kevlar fibres of that diameter and of a length (about 6 mm) much too great for paper-making which we had subjected to controlled process in a refiner, which fibrilates and reduces them to paper making length of the order of about 1 mm average, and to a range of diameters between 0.1 and 1.1 $\mu$m inclusive.

Refining is a process used in paper-making in which a stock of fibrous material in slurry form is repeatedly subjected to high shear. Control of the degree of length and diameter reduction when polyaramid filaments are treated can be achieved through control of the consistency of the slurry when it enters the refiner, the inlet pressure at that point, the power applied to the refiner and the rate of flow of the stock.

A slurry of polyaramid fibres at a fibre content of 2.5% by weight, 97.5% water, was treated in a Claflin 01 wide angle refiner at an inlet pressure of 15 psi, a stock flow rate of 50 liters/min and a nett power rate of 9 kw (a w/s/m in this particular machine of 2.75). This works the slurry at a light rate of applied power so that the fibres are not shattered but are gently reduced in diameter and (incidentally) in length.

The output slurry having a content of fibrilated polyaramid fibres of the range of diameter and length as mentioned after increasing its water content to 99.5 to 99.9% (most preferably about 99.7) was used in a conventional cylinder-mould paper-making machine to produce a filter paper which exhibited a mean pore size (determined by fluid displacement porosimetry) of 1 $\mu$m and a minimum pore size of 0.7 $\mu$m. Such paper equates with the particlar retention value obtained with the very expensive filter paper made from the finest glass microfibre (in a range from 0.2 to 0.4 $\mu$m diameter).

The present product is a filter paper of extremely fine pore size with good filtration speed and high particle retention and which has adequate stiffness and resilience. The product also exhibits improved resistance to both acid and alkali solutions and improved resistance to elution by aqueous solvents when compared with glass microfibre products. It may be completely binder-free.

By control of the amount of work done on the slurry in the refining stage, output slurries can be obtained with smaller or, usually, greater-thickness fibrous material in them up to say, about 4 $\mu$m, whereby the properties of larger pore size glass filter papers may be paralleled, for example those made from glass fibres up to about 5 $\mu$m, in high efficiency filter papers.

What I claim is:

1. A filter paper consisting essentially of split fibrilated polyaramid fibrous material.

2. A filter paper as claimed in claim 1 having a mean pore size of 1 micron and a minimum pore size of 0.7 micron.

3. A filter paper as claimed in claim 1, wherein the split fibrous material has a diameter between about 0.1 and about 1.1 micron.

4. A filter paper as claimed in claim 1 wherein the split fibrous material has diameters in the range of about 0.1 to 1.1 microns.

5. A filter paper as claimed in claim 1 wherein the fibrous material has an average length of about 1 mm.

6. A filter paper as claimed in claim 1 which is binder-free.

7. A filter paper material of small pore size, high particle retention and good filtration speed which consists essentially of fine polyaramid fibrous material produced by splitting polyaramid material in a controlled refining process.

8. A filter paper consisting essentially of split polyaramid fibrous material, said fibrous material having a diameter between about 0.1 and 1.1 microns, an average length of about 1 mm, and a mean pore size of 1 micron.

* * * * *